US007768695B2

(12) United States Patent
Dunn et al.

(10) Patent No.: US 7,768,695 B2
(45) Date of Patent: Aug. 3, 2010

(54) PARAMETRIC GENERATION USING INTERSECTING CAVITIES

(75) Inventors: Malcolm H. Dunn, Fife (GB); Cameron F. Rae, Fife (GB); Tom J. Edwards, Fife (GB); David J. M. Stothard, Fife (GB); David Walsh, Fife (GB)

(73) Assignee: The University Court of the University of St. Andrews, St. Andrews, Fife (GB)

( * ) Notice: Subject to any disclaimer, the term of this patent is extended or adjusted under 35 U.S.C. 154(b) by 0 days.

(21) Appl. No.: 12/160,296

(22) PCT Filed: Jan. 26, 2007

(86) PCT No.: PCT/GB2007/000292

§ 371 (c)(1),
(2), (4) Date: Jul. 8, 2008

(87) PCT Pub. No.: WO2007/085814

PCT Pub. Date: Aug. 2, 2007

(65) Prior Publication Data

US 2009/0021825 A1 Jan. 22, 2009

(30) Foreign Application Priority Data

Jan. 26, 2006 (GB) .................................. 0601596

(51) Int. Cl.
*G02F 1/39* (2006.01)

(52) U.S. Cl. .......................................... 359/330; 372/21

(58) Field of Classification Search ......... 359/326–330; 372/3, 21, 22
See application file for complete search history.

(56) References Cited

U.S. PATENT DOCUMENTS

| 5,841,570 A * | 11/1998 | Velsko ........................ 359/330 |
| 6,421,166 B1 * | 7/2002 | Velsko et al. ................. 359/330 |
| 2002/0024718 A1 * | 2/2002 | Kawase et al. ............... 359/330 |
| 2008/0037595 A1 * | 2/2008 | Gankkhanov et al. .......... 372/3 |

FOREIGN PATENT DOCUMENTS

| GB | 2 315 360 A | 1/1998 |
| WO | WO 2004/107033 | 12/2004 |
| WO | WO 2006/010916 A | 2/2006 |

OTHER PUBLICATIONS

International Search Report for corresponding PCT.GB2007/000292 completed Apr. 17, 2007 by Dirk Ammerlahn of the EPO.
Kawase K, et al: "Terahertz Wave Parametric Source" Journal of Physics D. Applied Physics, IOP Publishing, Bristol, GB vol. 35, No. 3, Feb. 7, 2002, pp. R1-R14, XP002348893 ISSN: 0022-3727 sections 3.2, 3.3 and Figs. 3;5;17.

(Continued)

*Primary Examiner*—Hemang Sanghavi

(57) ABSTRACT

A parametric device having a non-linear material (4) for generating an idler wave and a signal wave (16) in response to a pump wave (14), the pump, idler and signal waves being non-collinear, the device having a cavity (10, 11) resonant at the pump wavelength and means for varying the angle between the propagation directions of the pump and idler waves.

9 Claims, 5 Drawing Sheets

OTHER PUBLICATIONS

Terry J A C, et al.: "Broadband 1.5 [mu]m Source Through Type I and II Noncollinear Phase Matching of an Optical Parametric Oscillator"; Journal of the Optical Society of America B (Optical Physics) Opt. Soc. America USA, vol. 22, No. 10, Oct. 2005, pp. 2208-2218, XP002429622 ISSN: 0740-3224, section 3; Figs. 6 & 7.

Guohua Xiao et al: "Passively Q-Switched Solid-State Lasers with Intracavity Optical Parametric Oscillators" IEEE Journal of Quantum Electronics, IEEE Service Center, Piscataway, NJ US, vol. 34, No. 11, Nov. 1998, XP011052091, ISSN: 0018-9197; abstract, Fig. 1.

Yingxin Bai, et al: "Compact Intracavity Pumped Continuous-Wave Singly Resonant PPLN OPO" Lasers and Electro-Optics, 2004. (CLEO). Conference on San Francisco, CA USA May 20-21, 2004, Piscathaway, NJ USA, IEEE, vol. 1, May 17, 2004, pp. 109-110, XP010744995 ISBN: 1-55752-777-6; entire document.

Stothard D J M, et al.: "Hyperspectral Imaging of Gases with a Continuous-Wave Pum-Enhanced Optical Parametric Oscillator"; Optics Express, Optical Society of America, Washington, DC, US, vol. 12, No. 5, Mar. 8 2004, pp. 947-955, XP002367551 ISSN: 1094-4087 section 2; Fig. 1.

Edwards T J et al.: "Compact Source of Continuously and Widely-Tunable Terahertz Radiation"; Opt. Express, Optics Express Feb. 2006, vol. 14, No. 4, Feb. 2006, pp. 1582-1589, XP002429623 section 2; Fig. 1.

* cited by examiner

PARAMETRIC GENERATION USING INTERSECTING CAVITIES

The present invention relates to parametric generation of electromagnetic radiation in which a non-linear material when pumped by light energy produces radiation of different wavelengths to that of the pump energy, and in particular radiation that is outside the normally accepted transparency range of the non-linear material.

BACKGROUND OF THE PRESENT INVENTION

Parametric devices are flexible and convenient sources of widely-tunable coherent radiation, encompassing all timescales from the femtosecond pulse to the continuous-wave. In these, a coherent beam of electromagnetic radiation referred to as the pump wave is used to stimulate a non-linear process in a non-linear (optical) material, resulting in the division of the energy/power in the coherent pump into two generated waves, typically referred to as the signal and idler waves. The signal wave is usually defined as the wave providing the useful output from the device, although that is not invariably the case. In the present application, the signal wave has the longer wavelength of the two generated waves.

Parametric devices can operate in a variety of configurations including amplifiers, oscillators and generators. In a parametric amplifier an intense coherent pump wave is made to interact with the non-linear material to produce amplification at the signal and idler wavelengths. A parametric oscillator uses a parametric amplifier inside a cavity resonant at one or both of the signal and idler waves. In this case, the signal/idler waves are either self-starting from noise/parametric fluorescence or the cavity is injection seeded by a suitable source operating at the signal/idler wavelength.

Oscillators that are resonant at only one of the signal and idler wavelengths are referred to as being singly-resonant, whilst those that are resonant at both are referred to as doubly-resonant oscillator. As is well established in the literature the doubly-resonant oscillator has the advantage of a significantly lower oscillation threshold in terms of the pump power/energy required to bring the oscillator into oscillation compared to the singly-resonant oscillator. However, the doubly-resonant oscillator has serious disadvantages in terms of the attainment of smooth and continuous tuning of the signal/idler waves.

Parametric generators generate signal/idler waves by the interaction of an intense pump wave with a non-linear material to parametrically produce these two other waves. No cavity is provided for these down-converted waves since the parametric gain in this case is sufficiently high as to allow adequate transfer of energy/power to these waves with only non-resonant single (or multiple) passing of the signal and/or idler waves through the non-linear material. Again in this case the signal and/or idler waves are self-starting from noise/parametric fluorescence or the generator is injection seeded by a suitable source operating at the signal and/or idler wavelengths.

There is considerable interest in extending the spectral coverage of parametric devices. This is because they are often used as sources of coherent electromagnetic radiation in spectral regions either not covered by any other sources, or where a single parametric-wave source is capable of replacing a number of sources that would otherwise be needed in order to provide the spectral coverage required. However, a serious limitation encountered in attempting to extend the spectral coverage of parametric generation to new regimes of the electromagnetic spectrum is the detrimental effect of absorption within the non-linear material of one or more of the three waves involved in the non-linear interaction. Indeed, the spectral coverage attainable with a particular parametric generation scheme is often determined by the onset of such absorption rather than by the non-linear or phase-matching characteristics of the non-linear material. Hence, it follows that elimination of such a restriction would result in improved spectral coverage attainable through the parametric generation process.

One solution to the problem of absorption is to employ a configuration of interacting waves such that the wave subject to excessive absorption exits the non-linear material as rapidly as possible after its generation. This wave is usually, but not invariably, the signal wave. One method for doing this is based on using non-collinear phase matching in such a way as to cause the wave subject to absorption to rapidly walk out from the non-linear material in a direction that is substantially lateral to the propagation direction of the pump wave. This is illustrated in FIG. 1, which shows the geometry of the interacting pump 1, idler 2 and signal 3 waves in a non-linear material 4. FIG. 2 shows the phase-matching process through a so-called k-vector diagram where kp, ki, ks are the wave vectors of the pump, idler and signal respectively within the non-linear material, angle $\theta$ is the angle subtended by the pump 1 and idler 2 waves and angle $\phi$ the angle subtended by pump wave 1 and signal wave 3. By altering the angle $\theta$ between the pump 1 and idler 2 waves, the signal wave can be rapidly tuned over a wide range.

To maintain the necessary non-linear interaction between the pump wave 1 and the idler wave 2 of FIGS. 1 and 2, they must be of sufficient radial (transverse) extent to maintain overlap between them throughout the length of the non-linear material. The parametric gain scales with the radial extent of these beams. As a consequence of the limitation placed on the interaction between the three waves due to the lateral walk-off of the signal wave, the radial extent of the beams needs to be of the order of the absorption length of the signal wave in the non-linear medium in order to optimise the gain experienced by the idler wave 2.

Examples of the technique of FIGS. 1 and 2 are described in the articles "Efficient, tunable optical emission from LiNbO$_3$ without a resonator", by Yarborough et al, Applied Physics Letters 15(3), pages 102-4 (1969); "Coherent tunable THz-wave generation from LiNbO$_3$ with monolithic grating coupler", by Kawase et al, Applied Physics Letters 68(18), pages 2483-2485 (1996); and "Terahertz wave parametric source" by Kawase et al, Journal of Physics D: Applied Physics 35(3), pages R1-14 (2002), the contents of which are incorporated herein by reference.

A problem with the arrangement of FIGS. 1 and 2 is that because of the reduced interaction between the three waves, the oscillation threshold is increased compared to conventional devices where the waves are all collinear. This has the undesirable consequences of limiting the applicability of the technique to materials exhibiting high non-linear coefficients, as well as requiring pump waves of high energy/power, and so demanding the undesirable use of high-energy/power lasers. This latter requirement prevents the development of compact and portable versions of these devices, so limiting their utility.

An alternative approach to that illustrated in FIGS. 1 and 2 is to arrange for the pump 1 and idler 2 waves to propagate collinearly through the non-linear material 4 while still maintaining the substantially lateral propagation of the signal wave 3. This condition of operation is effected by the use of a slant-stripe-type periodically-poled crystal as the non-linear material. FIG. 3 illustrates this hybrid collinear/non-collinear phase-matching process. FIG. 4 illustrates the phase-matching process through a k-vector diagram, in which K is the grating vector that describes the slant-stripe, periodically-poled non-linear crystal. Examples of this technique are described in co-pending international patent application PCT/GB2005/002912, the contents of which are incorporated herein by reference.

In this case, the presence of the additional vector K allows the pump 1 and idler 2 waves to propagate collinearly within the non-linear crystal 4 while the signal wave exits substantially laterally as required. Indeed it is apparent that it can be so arranged that the signal wave 3 propagates orthogonal to the collinear pump 1 and idler 2 waves. Having the pump 1 and idler 2 waves collinear means that common elements can be used such as, but not restricted to, mirrors for the guidance or resonance of these waves. This can simplify otherwise complicated arrangements. In addition, the common-path approach associated with the collinear propagation of the pump 1 and idler 2 waves confers the advantage of enhanced geometrical/mechanical stability.

Whilst the arrangement illustrated by FIGS. 3 and 4 confers some technical advantages, because it requires the fixing of the propagation direction of the idler wave 2 to be collinear with the propagation direction of the pump wave 1, the ability to attain wide and continuous tuning of the parametric process through the use of angle tuning is lost.

For the purpose of minimising the external pump power required to reach oscillation threshold, an approach adopted in the prior art is to place the optical parametric oscillator within the cavity of the laser used to generate the pump wave and in such a way that all three waves are collinear within the non-linear crystal, an arrangement generally referred to as an intracavity optical parametric oscillator. Because the non-linear medium experiences a pump wave with the intensity associated with the internal radiation field of the pump laser, which is generally substantially greater than the external radiation field available under optimum output coupling from the same pump laser, the requirements on the energy and power of the pump laser are significantly relaxed, leading to more compact devices. Examples of this are described in U.S. Pat. No. 3,628,186; U.S. Pat. No. 5,117,126; GB 2,252,840 A; U.S. Pat. No. 5,195,104; U.S. Pat. No. 5,181,211; U.S. Pat. No. 5,291,503; WO 94/24735; and EP 0 644 636 A2, the contents of which are incorporated herein by reference. However, none of the systems described in these allow for the rapid exit of the required signal wave from the non-linear material, simultaneously with wide and continuous tuning.

SUMMARY OF THE INVENTION

According to the present invention, there is provided a parametric device having a non-linear material for generating idler and signal waves in response to a pump wave, the pump, idler and signal waves being non-collinear, the device having a cavity resonant at the pump wavelength and means for varying the angle between the propagation directions of the pump and idler waves.

The present invention provides a cavity for causing the pump wave to resonate. The device is arranged so that there is adequate spatial overlap of the pump and idler waves around the point of intersection. The non-linear material is placed appropriately at this region of overlap. Means are provided for altering the angle between the direction of propagation of the pump and idler waves so as to provide broad and continuous tuning of the signal wave, whilst maintaining both the required degree of overlap of the pump and idler waves and the required lateral walk-off of the signal wave.

The idler wave direction may be defined by a cavity designed to resonate the idler wave. The idler wave may be allowed to define its own propagation direction through the nonlinear gain medium. This propagation direction may be defined by the injection of a seeding wave at the wavelength of the idler wave into the nonlinear gain medium.

The pump wave cavity may contain one or more components required for the operation of the pump laser, for example a pump wave gain medium. This is referred to as a pump-generating geometry.

Alternatively, the pump wave cavity may be held on resonance by means of suitable servo-control systems so as to resonantly enhance a pump wave generated using a pump laser external to the cavity, but coupled into the cavity by suitable mode-matching/isolating optics. This is referred to as pump enhancement geometry.

The present invention provides a system that reduces the pump power/energy required to reach oscillation threshold, and allows the non-linear material to experience either the intracavity field of the pump laser or the resonantly enhanced field of the pump laser, while at the same time avoiding the disadvantages of lack of angular tuning and lateral beam walk-off of the signal wave.

BRIEF DESCRIPTION OF THE DRAWINGS

Various aspects of the invention will now be described with reference to the accompanying drawings, of which.

DETAILED DESCRIPTION OF THE DRAWINGS

Figure 1:
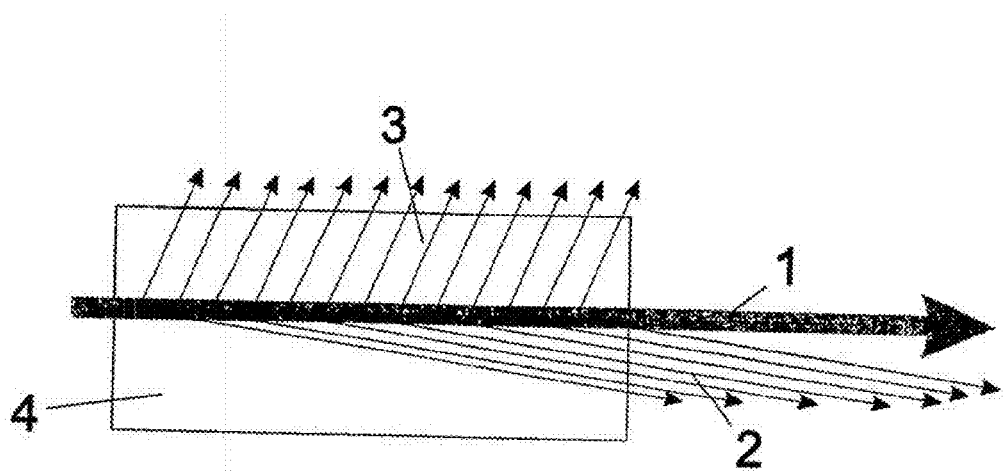
FIG. 1 is a schematic diagram of the geometry of pump, idler, and signal waves in a non-linear material.
Figure 2:
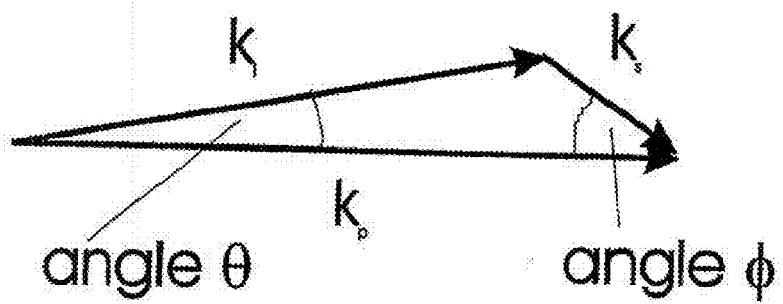
FIG. 2 is a schematic diagram of a phase-matching process.
Figure 3:
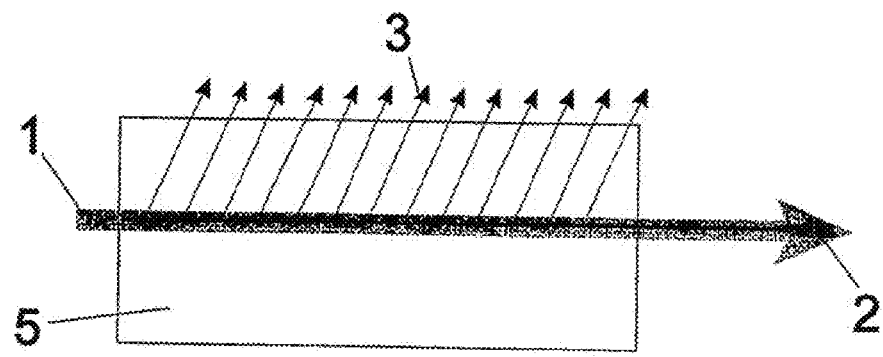
FIG. 3 is a schematic diagram of a hybrid collinear/non-collinear phase-matching process.
Figure 4:
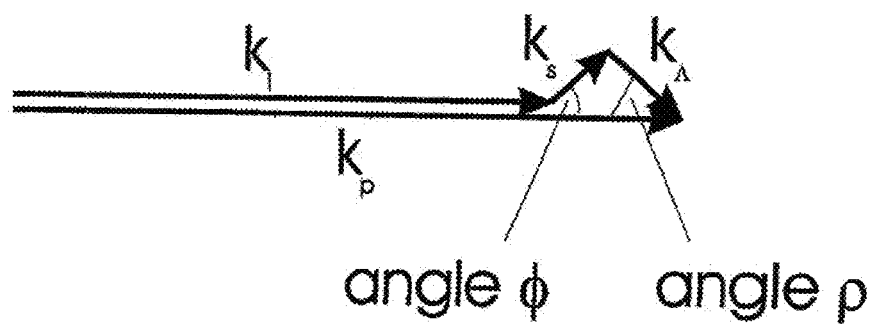
FIG. 4 is another schematic diagram of a phase-matching process.
Figure 5:
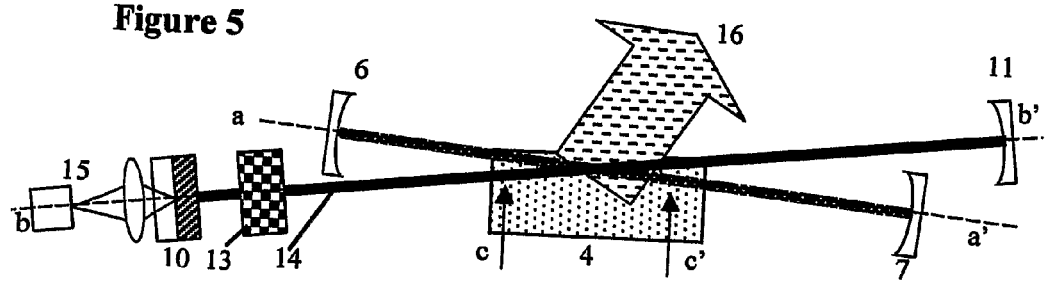
FIG. 5 is a schematic diagram of a parametric oscillator based on a pump-generating geometry with intersecting pump wave and idler wave cavities.

FIG. 5 shows an intersecting cavity parametric oscillator. This has a non-linear medium 4 located within an idler wave cavity that is defined by two mirrors 6 and 7 and a pump wave cavity that is defined by mirrors 10 and 11. Within the pump wave cavity is a gain medium 13 for the pump wave, and means for controlling the pump wave 14, such as, for example a Q-switch and/or frequency controller. This is a configuration in which the pump wave is generated within the pump cavity. This configuration is generally referred to as a pump-generating geometry. The gain medium 13 is excited by an external primary pumping source 15, such as laser diodes incorporating suitable coupling optics. The optical axis aa' of the idler wave cavity is arranged to intersect the axis bb' of the pump wave cavity, so that significant overlap of the two waves occurs in the region cc' within the non-linear material 4. Means are provided for varying the angle between the optical axes aa' and bb'. For example, any suitable mechanical arrangement could be used.

In use, the signal wave 16 of FIG. 5 exits laterally from the overlap region, thereby to avoid absorption. The wavelength of the signal wave 16 can be tuned merely by varying the angle between optical axes aa' and bb'. Hence, the oscillator allows for the rapid exit of the required signal wave from the non-linear material, whilst simultaneously providing wide and continuous tuning.

Figure 6:
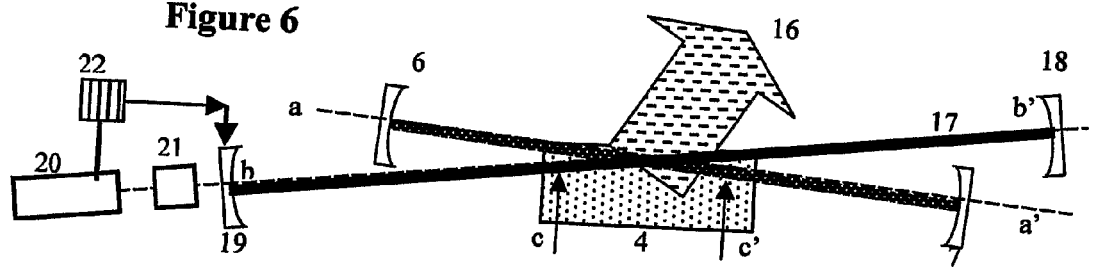
FIG. 6 is a schematic diagram of a parametric oscillator based on a pump-enhancement geometry with intersecting pump wave and idler wave cavities.

FIG. 6 shows another parametric device that has a non-linear medium 4 located within an idler wave cavity that is defined by two mirrors 6 and 7 and a pump wave cavity 17 that is defined by mirrors 18 and 19. In this case, only the non-linear medium 4 is located in the pump cavity. The pump cavity 17 is held on resonance with the pump wave provided by an external pump laser 20 through the use of appropriate mode matching and isolation optics 21 and a servo-control system 22. This configuration is generally referred to as a pump-enhancement geometry. In this case, the optical axis aa' of the idler wave cavity intersects the optical axis of the pump-enhancement cavity 17, in such a manner that significant overlap of the two waves occurs in the region cc' within the non-linear material 4.

In use, the signal wave 16 of FIG. 6 exits laterally from the overlap region, thereby to avoid absorption. The wavelength of the signal wave can be tuned merely by varying the angle between optical axes aa' and bb'. Hence, the oscillator allows for the rapid exit of the required signal wave from the non-linear material, whilst simultaneously providing wide and continuous tuning.

Figure 7:
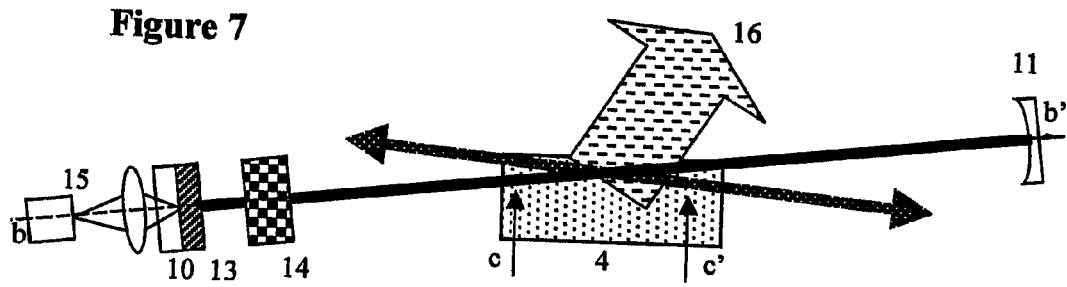
FIG. 7 is a schematic diagram of a parametric generator based on a pump-generating geometry in which the idler wave builds up a coherent signal from noise in a single pass of the non-linear material.

FIG. 7 shows a parametric generator that is similar to FIG. 5. However, in this case the idler cavity is removed and the idler wave builds up as a coherent signal from noise in a single pass of the non-linear material assuming a propagation direction appropriate to maximum down-conversion. The propagation direction, and hence the tuning of the device, is determined by the balance between the constraints placed on the nonlinear conversion process such as energy conservation, phase-matching, parametric gain, signal wave absorption, and overlap of idler and pump waves. By varying the angle between the propagation directions of the pump and idler waves, this device can be tuned.

Figure 8:
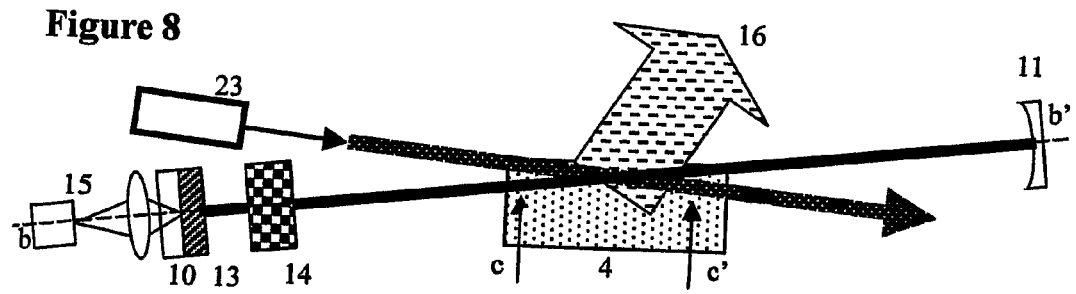
FIG. 8 is a schematic diagram of a parametric generator based on a pump-generating geometry in which the idler wave is injection seeded.

FIG. 8 shows another parametric generator that is similar to FIG. 7. This is an injection-seeded parametric generator in which the idler cavity is replaced by an injected wave generated by an injection seeder 23, and arranged so as to propagate along the axis previously associated with the idler cavity and with a wavelength appropriate to the wavelength of the idler wave supported formerly by the idler cavity. The wavelength and direction of propagation of the idler wave produced by parametric generation is determined by the direction of propagation and wavelength of the injected wave. Further the idler wave grows by amplification of the coherent injected wave rather than by amplification of noise as in FIG. 7. Therefore, the single-pass gain required for efficient down-conversion to take place is reduced. In this case, the device is fully tunable by suitably altering the propagation direction of the injected wave in step with changing its wavelength. Injection of a narrow linewidth wave can result in line-narrowing of both the signal and idler waves generated through down conversion.

Figure 9:
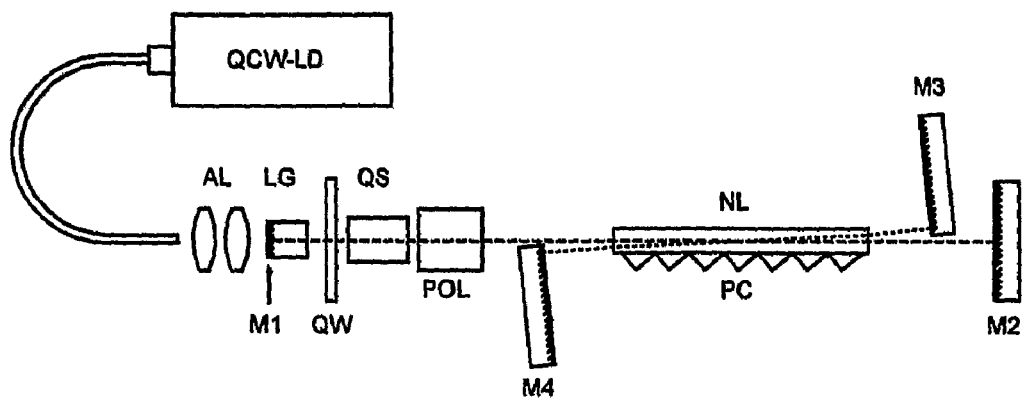
FIG. 9 is a schematic diagram of a particular parametric oscillator for generating terahertz radiation, given by way of example only.

FIG. 9 shows an example of a parametric oscillator with an intersecting cavity geometry, specifically arranged for the purpose of generating THz radiation (signal wave). The pump wave cavity is formed by mirrors M1 and M2, physically separated by 37 cm, and includes the laser gain medium (LG), polarisation control optics (QW, QS and POL) and the parametric oscillator nonlinear crystal (NL). The laser gain medium is a neodymium yttrium aluminium garnet crystal (Nd:YAG) with dimensions 4 mm diameter×7 mm length and is excited by a quasi-continuous-wave laser-diode (QCW-LD) as the external pump source. The QCW-LD is operable at up to 100 Hz pulse repetition rate with a pulse duration of up to 500 μsec and peak power in excess of 100 W (50 mJ per pulse).

The output from the QCW-LD is fibre delivered and coupled to the laser gain medium via a pair of aspheric lenses (AL). A first aspheric lens, with numerical aperture consistent with the fibre output (NA 0.22), serves to collimate the fibre output while the second forms an image of the fibre exit aperture (close to 1:1 object-image ratio) in the Nd:YAG crystal. The polarisation state of the resonant pump wave is determined by the insertion in to the pump wave cavity of an air spaced cube polariser (POL). In order to achieve the desired peak power in the pump wave, the pump laser is Q-switched through the insertion of a quarter-waveplate (QW) and electro-optic Q-switch (QS) based on deuterated potassium di-hydrogen phosphate (KD*P). The action of these elements in association with the polariser follows a standard mode of operation. In the experimental system a pump pulse duration, in the absence of any parametric generation process, of typically 30 nsec is achieved and at the maximum QCW-LD excitation energy the pump pulse energy is greater than 5 mJ.

The mirrors forming the pump laser cavity comprise M1, which is a high reflector (>99.8% R@1064 nm) coating applied directly to the rear face of the Nd:YAG crystal (this being a dichroic coating also transmitting the 808 nm QCW-LD excitation light), and M2, which is a partial reflector coating (R=90%@1064 nm) applied to a plane mirror substrate. This latter mirror is not for the purpose of output coupling since the intention is to maintain the highest intracavity power possible consistent with the avoidance of optical damage. While typically transmissions of the order of 5-10% are utilised in practice resulting in intracavity powers of the order of 10 to 20 times greater than the output power attainable under optimised output coupling, higher enhancements are possible, but limitation to the above values is consistent with the avoidance of optical damage, and the requirement to monitor reliably the intracavity power. The modal (spatial) quality of the pump wave in this plane-plane resonator is then determined by a combination of thermal lensing, gain guiding and soft aperturing by the extent of the excited volume in the laser gain medium, the combined effect of which result in a near diffraction limited pump mode. All other optical surfaces in the pump wave cavity are anti-reflection coated at the pump wave wavelength of 1064 nm.

The nonlinear crystal NL is magnesium oxide doped lithium niobate (MgO:LiNbO$_3$) and has an aperture in the xz-plane of dimensions 5 mm×5 mm, as seen by the pump and idler waves, and length along the x-axis of 50 mm. The crystal is oriented such that the electric vectors of the pump, idler and signal waves lie along the z-axis, and propagation of the pump wave is along the x-axis. The parametric oscillator cavity is formed by the plane mirrors M3 and M4, which are respectively a high reflector and a partial reflector (R~98%) at the idler wavelength. It is convenient that as the idler wavelength is close to the pump these can be standard Nd laser cavity mirrors.

The mirrors M3 and M4 are set in adjustable mirror mounts for ease of alignment, but notably these mounts are located on the ends of a common rotatable bar centred above the nonlinear crystal to allow easy angular adjustment of the idler cavity axis relative to the pump wave, and hence tuning of the signal/idler wavelengths through the non-collinear phasematch geometry. The physical length of the idler cavity is 13 cm and forms an intersecting cavity with the pump wave resonator, where the central point of intersection is within the nonlinear crystal. Ideally the idler cavity would be made shorter. However, it is constrained by the need for the pump and idler waves to be physically separated so that the idler cavity mirrors do not impede the pump wave. The highly non-collinear phasematch geometry, as it relates to the generated signal (THz) wave, results in the THz wave exiting the nonlinear crystal through a side face. The 5 mm×50 mm side faces of the nonlinear crystal having their normal perpendicular to the crystallographic z-axis are then fabricated with a good optical polish. Due to the high refractive index of MgO: $LiNbO_3$ at THz wavelengths (~5.2), the total internal reflection angle for a crystal-air interface is just around 11-degrees, as measured from the normal to the interface.

In this non-collinear phasematch geometry of FIG. 9, the THz wave is incident at an angle of around 30-degrees and hence would be totally internally reflected and not output coupled. To circumvent this problem a prismatic output coupler is used. In this case prisms fabricated from silicon (refractive index ~3.2) are placed against the polished face of the lithium niobate crystal increasing the total internal reflection angle at the now crystal-silicon interface to around 38-degrees and hence allowing output coupling. The prismatic form of the silicon allows near normal incidence of the THz wave at the outer surface of the prisms. Fresnel reflection from this surface remains significant at this time (~27%), but could be reduced in the future by the application of an index matching layer.

The oscillation threshold of the above device corresponded to a pump pulse energy of the order of 0.7 mJ at 1064 nm, when the associated peak intracavity intensity of the pump radiation was 12 $MWcm^{-2}$, with a pump pulse duration of 45 ns (FWHM). When the pump pulse energy was increased to 1.3 mJ (twice threshold), corresponding to a peak intracavity intensity for the pump pulse of 25 $MWcm^{-2}$, the pump pulse depletion was close to 50%, corresponding to around 0.6 mJ of the pump pulse energy being down-converted into signal/idler wave energy. Under these conditions a THz output with a pulse energy of the order of 5 nJ and a pulse duration of a few nanoseconds was obtained.

On altering the angle between the pump wave and the resonated idler wave over the range 1 to 3°, by rotating the idler cavity as described above, the frequency of the output pulse was tuned from 1.2 to 3.05 THz. The device was operated at a repetition rate of 15 Hz. Operating at twice oscillation threshold was sufficient to ensure that the nonlinear down-conversion process itself effectively cavity dumped all the circulating energy within the pump field at a point in time just at the peak of the Q-switched pulse, which itself corresponded to the efficient extraction of the stored energy in the population inversion in the Nd gain medium into the circulating intracavity pump field. Hence, the system of FIG. 9 provided a relatively simple and robust means for generating terahertz radiation.

A skilled person will appreciate that variations of the disclosed arrangements are possible without departing from the invention. For example, although FIG. 7 and FIG. 8 show a pump cavity based on a pump generating geometry, it will be appreciated that a pump-enhancement geometry is equally applicable. Accordingly, the above description of a specific embodiment is made by way of example only and not for the purposes of limitations. It will be clear to the skilled person that minor modifications may be made without significant changes to the operation described.

The invention claimed is:

1. A parametric device having a non-linear material for generating idler and signal waves in response to a pump wave, the pump, idler and signal waves being non-collinear, the device having a cavity resonant at the pump wavelength and which contains the nonlinear material, and means for varying the angle between the propagation directions of the pump and idler waves.

2. A device as claimed in claim 1, wherein the cavity resonant at the pump wavelength contains the gain medium of the pump laser.

3. A device as claimed in claim 1, wherein the cavity resonant at the pump wavelength is such as to resonantly enhance a pump wave generated by an external pump laser.

4. A device as claimed in claim 1 comprising a cavity that is resonant at the idler wavelength.

5. A device as claimed in claim 4, wherein the wavelength of the idler wave is determined by injection into the nonlinear material of a seeding wave from an external source.

6. A device as claimed in claim 1, wherein the direction of propagation and wavelength of the idler wave is determined by injection into the nonlinear material of a seeding wave from an external source.

7. A device as claimed in claim 2, wherein the direction of propagation and wavelength of the idler wave is determined by injection into the nonlinear material of a seeding wave from an external source.

8. A device as claimed in claim 3, wherein the direction of propagation and the wavelength of the idler wave is determined by injection into the nonlinear material of a seeding wave from an external source.

9. A device as claimed in claim 1 arranged to generate terahertz radiation.

* * * * *